(12) United States Patent
Erdogan et al.

(10) Patent No.: US 9,423,622 B2
(45) Date of Patent: Aug. 23, 2016

(54) GLASS BLOCK DICHROIC BEAMSPLITTERS

(71) Applicant: Semrock, Inc., Rochester, NY (US)

(72) Inventors: Turan Erdogan, Spencerport, NY (US);
Ligang Wang, Cupertino, CA (US);
Prashant Prabhat, Rochester, NY (US)

(73) Assignee: Semrock, Inc., Rochester, NY (US)

( * ) Notice: Subject to any disclaimer, the term of this patent is extended or adjusted under 35 U.S.C. 154(b) by 375 days.

(21) Appl. No.: 13/801,086

(22) Filed: Mar. 13, 2013

(65) Prior Publication Data

US 2013/0308198 A1 Nov. 21, 2013

Related U.S. Application Data

(60) Provisional application No. 61/648,242, filed on May 17, 2012.

(51) Int. Cl.
| | |
|---|---|
| *G02B 27/12* | (2006.01) |
| *G02B 27/10* | (2006.01) |
| *G02B 27/14* | (2006.01) |

(52) U.S. Cl.
CPC .......... *G02B 27/126* (2013.01); *G02B 27/1006* (2013.01); *G02B 27/142* (2013.01); *G02B 27/149* (2013.01)

(58) Field of Classification Search
CPC . G02G 27/145; G02G 27/126; G02G 27/283; G02G 5/04; H04N 9/3197

USPC ............... 359/638, 640, 634, 487.04
See application file for complete search history.

(56) References Cited

U.S. PATENT DOCUMENTS

| | | | |
|---|---|---|---|
| 4,857,997 A | 8/1989 | Fukami et al. | |
| 4,873,569 A | 10/1989 | Hirosawa | |
| 5,644,432 A | 7/1997 | Doany | |
| 5,777,796 A | 7/1998 | Burstyn | |
| 5,828,497 A | 10/1998 | Neumann et al. | |
| 7,068,430 B1 | 6/2006 | Clarke et al. | |
| 7,640,691 B2 | 1/2010 | Karcher et al. | |
| 7,773,302 B2 | 8/2010 | Erdogan et al. | |
| 2003/0142404 A1* | 7/2003 | Nagatoshi | 359/557 |

* cited by examiner

*Primary Examiner* — Bumsuk Won
*Assistant Examiner* — Tamara Y Washington
(74) *Attorney, Agent, or Firm* — Louis S. Horvath

(57) ABSTRACT

A dichroic beamsplitter has a composite prism that has at least first and second prism elements that are coupled together along facing surfaces, wherein the respective facing surfaces of the first and second prism elements are equidistant from each other. The composite prism has a first flat external surface that lies within a first plane, a second flat external surface that lies within a second plane that is perpendicular to the first plane, a third flat external surface that lies within a third plane that is parallel to the second plane, and a coated surface internal to the composite prism and having a multilayer thin-film dichroic beamsplitter coating, wherein the coated surface lies within a fourth plane that intersects at least one of the first, second, and third planes at an angle that is less than about 25 degrees.

20 Claims, 16 Drawing Sheets

GLASS BLOCK DICHROIC BEAMSPLITTERS

CROSS-REFERENCE TO RELATED APPLICATIONS

This application claims the benefit of U.S. Provisional Patent Application Ser. No. 61/648,242 filed May 17, 2012 in the names of Turan Erdogan et al., the contents of which are incorporated fully herein by reference.

FIELD OF THE INVENTION

This invention generally relates to apparatus and methods for separation of light paths according to spectral content and more particularly relates to dichroic beamsplitter prisms.

BACKGROUND OF THE INVENTION

Optical beamsplitters are used in a number of different applications. In spectroscopy and other instrumentation systems, for example, a beamsplitter is used to direct excitation energy of one wavelength toward a sample along a first optical path and to direct emitted light that has been excited from the sample to sensing components along a second optical path, which can be in the opposite direction from some portion of the first optical path. The beamsplitter reflects light of at least one wavelength band and transmits light of another wavelength band or bands.

The schematic diagram of FIG. 1 shows one exemplary optical apparatus that uses a beamsplitter. In a fluorescence microscope 10, excitation light of wavelength $\lambda 1$, directed through a lens 34 from a light source 12, is first filtered by an excitation filter 20 and then reflected from a dichroic beamsplitter 22 before being directed to a sample 14 through an objective lens 24. Fluorescent molecules in sample 14 absorb this light, and then emit longer-wavelength fluorescence light of wavelength $\lambda 2$, some of which is captured by the objective lens 24 and imaged through one or more secondary lenses 26 onto a detector 28 (such as a human eye or charge-coupled device or CCD camera). The fluorescence is transmitted through the same dichroic beamsplitter 22 as well as through an emission filter 32 which is required to block all unwanted background light as well as light from the excitation light source 12.

A similar configuration to that shown in FIG. 1 is generally used for other types of spectroscopy measurement systems in which a generally shorter-wavelength excitation light source generates light at longer wavelengths to be spectrally detected, such as Raman spectroscopy. For reasons of mechanical convenience, compactness, and stability, it is generally desirable for the excitation light to be incident on the imaging path at a 90° angle, such as shown in FIG. 1. This light is incident on the dichroic beamsplitter at 45°.

In many systems a plate dichroic beamsplitter is used, which comprises a multilayer thin-film coating applied to one surface of a thin parallel plate of glass. The back surface of this filter may be anti-reflection coated to minimize loss of light and extraneous reflections.

In practice, a plate dichroic beamsplitter is a workable solution only when the light between the objective lens 24 and the secondary lens 26 is highly collimated, as in the FIG. 1 example. If this light is not collimated, however, the tilted parallel plate of glass on which the thin-film coating is formed causes increased spherical aberration as well as appreciable asymmetric aberrations, such as coma and astigmatism, at the image. Furthermore, the tilted plate causes a slight lateral shift of the optical axis OA. In some systems it is not desirable or possible to tolerate a lateral shift of the beam of image-bearing light, and therefore, of the optical axis, as caused by the tilted parallel plate.

To avoid these aberrations in systems where the light is not collimated, as well as to minimize or eliminate the lateral beam shift, some systems use cube or cubic dichroic beamsplitters, as shown in FIG. 2. A cube dichroic beamsplitter 120 is formed as a type of composite prism from two right-angle component prism elements 122a and 122b, each joined to the other along the facing surface that is its hypotenuse, with a multilayer thin-film coating 124 applied to one hypotenuse or the other hypotenuse. This arrangement embeds dichroic coating 124 within the glass substrate. Optical contact between the component prism elements can be effected in a number of ways familiar to those skilled in the optical arts, such as using an index-matching cement, or employing what is known as direct optical contact (glass-to-glass bonding by weak van der Waal's forces), or with strong, chemically activated molecular glass-to-glass bonding. In some cases, there can also be a fixed gap such as an air gap maintained between the two component prisms. Because light only enters and exits any glass surface at or near normal incidence (0°) with these prisms, the cube beamsplitter approach solves the optical aberration and beam shift problems described earlier.

One notable drawback of the cube approach, however, relates to high angles of light incidence on the embedded multilayer thin-film coating 124 that lies within the prism. It is well-known that filter response for thin film filters changes with angle, so that multilayer thin film coatings tend to degrade in performance as the angle of incidence increases.

With the plate beamsplitter, as in FIG. 1, light is incident on the dichroic surface at 45° in air. However, due to Snell's law of refraction, the light bends upon entering the glass substrate, so that its incident angle, relative to the thin film layers coated on the glass, is refracted to about 28° (assuming an index of refraction near 1.5 for the glass substrate of beamsplitter 22). This is a suitable angle for reasonable dichroic coatings performance and the plate beamsplitter 22 can provide effective separation of light for many applications with incident light in this range.

However, the case is different with the cube beamsplitter. Light traveling within the cube substrate does not refract as it nears the multilayer thin-film coating and is incident on the thin-film coating at a much higher angle of incidence than it is in the case of the plate beamsplitter. It is much more difficult to design and fabricate a dichroic beamsplitter coating with a steep, well-defined edge transition between reflection and transmission for light incident at 45°. At higher incidence angles, polarization differences compromise beamsplitter performance. P-polarized light experiences much lower reflection than s-polarized light, and the wavelength location of a filter edge tends to be very different for s- and p-polarized light. This behavior, termed "polarization splitting", tends to broaden transition edges of the filters. As a result, the spectral performance of the cube dichroic beamsplitter that has an embedded coating can be disappointing, resulting in poorer overall system efficiency and, in many cases, resulting in lower signal sensitivity.

Conventional cube beamsplitter designs that use embedded multilayer thin-film coatings are hampered by poor performance at high incidence angles and are unable to benefit from the advantages dichroic beamsplitter thin-film coatings have at lower angles of incidence. For example, fewer thin film layers are needed for a given amount of reflectivity or edge steepness at lower angles of incidence. This has advantages of reduced cost and improved edge steepness over multilayer coatings designed for higher incidence angles. As yet another consideration, a coating with fewer layers generally also exhibits lower group delay dispersion (all other performance parameters being equal), with significantly improved performance for beamsplitters that reflect femtosecond laser pulses.

Still another consideration relates to the demands of the optical system itself. Various types of composite prisms with embedded dichroic coatings or coatings applied to one or more surfaces have been designed for color splitting or combining, such as in camera and projection apparatus, for example. None of these conventional solutions, however, is well-suited for use in a spectroscopy measurement system. In the spectroscopy apparatus, input light at one wavelength is reflected toward a sample along an optical imaging path, while light of a different, typically longer wavelength is transmitted through the beamsplitter along the same optical path in the opposite direction, entering and exiting the glass block at or near normal incidence.

In summary, although the cube beamsplitter has clear advantages that relate to mounting, light handling, and durability, the poor relative spectral performance of these devices makes them less desirable than plate beamsplitters for light separation in many applications.

Therefore, there is a need for a dichroic beamsplitter cube that supports orthogonal input and output light paths, that takes advantage of the low aberration and beam shift of a glass cube or prism when contrasted with a plate dichroic in imperfectly collimated light, and that has improved spectral performance over conventional cube beamsplitter designs.

SUMMARY OF THE INVENTION

It is an object of the present invention to advance the art of spectral separation of light. Dichroic beamsplitter solutions presented herein reduce or eliminate aberrations and beam shift associated with conventional plate dichroics when used in imperfectly collimated light. Embodiments of the present invention provide improved spectral performance over conventional cube or prism beamsplitter designs using arrangements that reduce the angle of incidence to internal thin-film surfaces to well below 45°. Embodiments of the present invention employ a glass block assembly that enables an incident beam of light at one range of wavelengths to enter the glass block assembly at, or near, normal incidence and to be reflected at a 90° angle into the main optical imaging path, while simultaneously enabling light at another range of wavelengths to enter and exit the glass block assembly at or near normal incidence at both interfaces and along the same optical imaging path, such that both beams of light are incident on an embedded multilayer thin-film dichroic coating at an angle of incidence that is substantially less than 45°.

Embodiments of the present invention provide beamsplitters with enhanced blocking of unwanted wavelengths. For a number of applications, such as for spectroscopic microscope applications, this capability can reduce the performance requirements for emission filters for isolating excitation light from the signal path.

According to an embodiment of the present invention, there is provided a dichroic beamsplitter comprising:
 a composite prism that has at least first and second prism elements that are coupled together along facing surfaces, wherein the respective facing surfaces of the first and second prism elements are equidistant from each other, wherein the composite prism has a first flat external surface that lies within a first plane, a second flat external surface that lies within a second plane that is perpendicular to the first plane, a third flat external surface that lies within a third plane that is parallel to the second plane, and
 a coated surface internal to the composite prism and comprising a multilayer thin-film dichroic beamsplitter coating, wherein the coated surface lies within a fourth plane that intersects at least one of the first, second, and third planes at an angle that is less than about 25 degrees.

Additional features and advantages will be set forth in part in the description which follows, being apparent from the description or learned by practice of the disclosed embodiments. The features and advantages will be realized and attained by means of the elements and combinations particularly pointed out in the appended claims.

It is to be understood that both the foregoing general description and the following detailed description are exemplary and explanatory only, and are not restrictive of the scope of the embodiments as claimed.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

Figure 1:
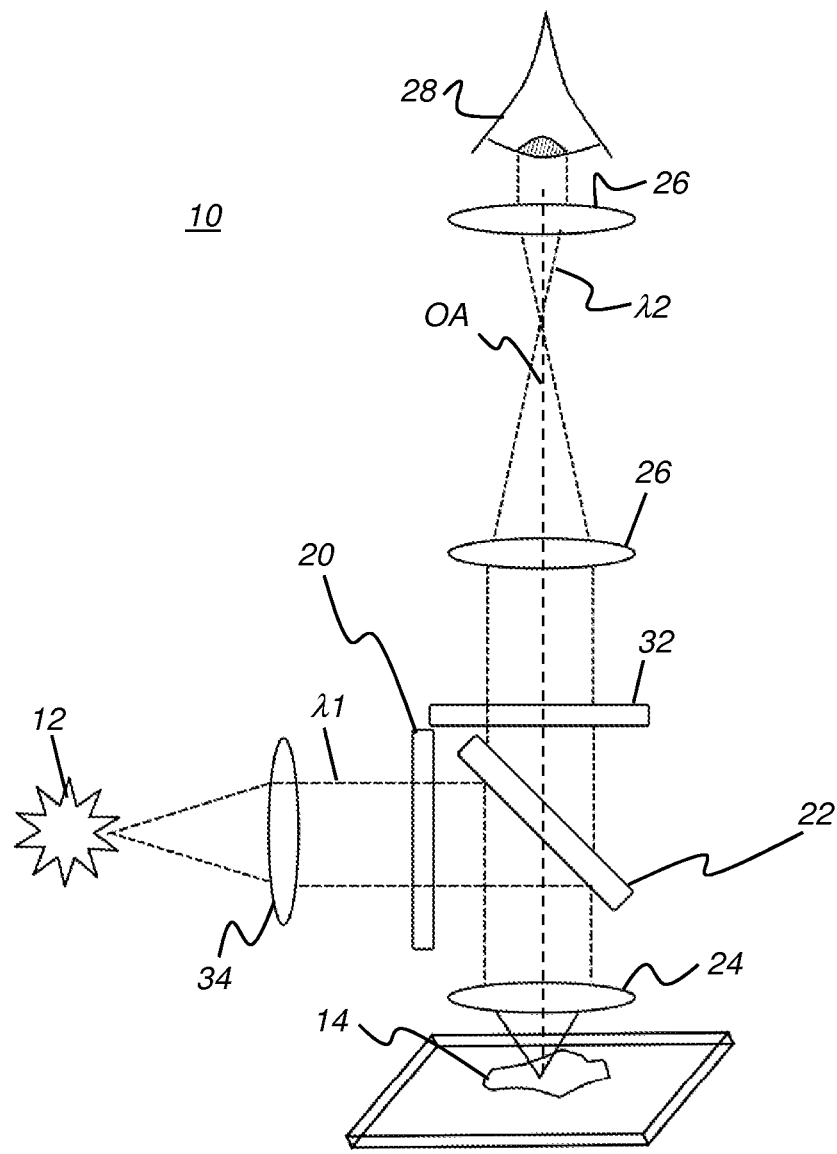
FIG. 1 is a schematic block diagram that shows components of a conventional fluorescence microscope.
Figure 2:
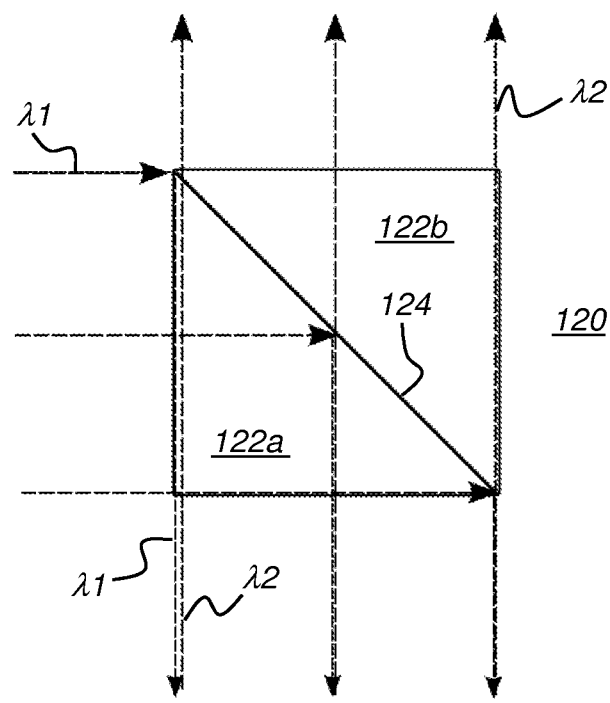
FIG. 2 is a schematic block diagram that shows a conventional cube beamsplitter in side view.

The present description is directed in particular to elements forming part of, or cooperating more directly with, apparatus in accordance with the invention. It is to be understood that elements not specifically shown or described may take various forms well known to those skilled in the art.

Figures shown and described herein are provided in order to illustrate key principles of operation and component relationships along their respective optical paths according to the present invention and are not drawn with intent to show actual size or scale. Some exaggeration may be necessary in order to more clearly emphasize basic structural relationships or principles of operation. In addition, some of the figures provided may, for the sake of clarity, show space between components that are actually in optical contact in the claimed apparatus.

Where they are used, the terms "first", "second", "third", and so on, do not necessarily denote any ordinal or priority relation, but are simply used to more clearly distinguish one element from another.

The term "oblique" is used herein to refer to an angular relationship that is other than substantially orthogonal or parallel, that is, at least about 5 degrees from any integer multiple of 90 degrees.

The term "prism" or "prism element" is used herein as it is understood in optics, to refer to a transparent optical element that is generally in the form of an n-sided polyhedron with flat surfaces upon which light can be incident and that is formed from a transparent, solid material that refracts light that enters and exits the element. It is understood that, in terms of shape and surface outline, the optical understanding of what constitutes a prism is less restrictive than the formal geometric definition of a prism and encompasses that more formal definition. In optics, for example, the term "prism" is also used in reference to a composite element, formed from two or more component prism elements that are glued or otherwise coupled together, including those in optical contact, and including composite elements that are mechanically coupled but have a thin gap at the interface between them, wherein the gap is a fixed distance and is filled with air or epoxy, for example.

In the context of the present disclosure, the term "penta prism" includes prisms that, from a side view, have five sides for light transmission or reflection, including, but not limited to, the penta prism that has the angular arrangement used to turn an image by 90 degrees, as used in an SLR (single-lens reflex) camera, for example.

In the context of the present disclosure, the individual prism elements that form a composite prism are termed "component prisms". The descriptive term "substantially normal" means within no more than about +/−5.0 degrees of 90 degrees, preferably as close to 90 degrees as possible.

In the context of the present disclosure, two facing surfaces are parallel to each other and are considered to be equidistant from each other if the two surfaces are either in optical contact against each other or are spaced apart by a uniform distance that varies by no more than about +/−20 microns from an averaged or nominal value.

In the context of the present disclosure, the terms "configured", "treated", or "formed" are used equivalently with respect to the fabrication of thin film filters designed to provide a particular spectral characteristic.

Optical filters formed or configured according to embodiments of the present invention generally employ the basic structure of a thin film interference filter as described in the background section. In this basic structure, a plurality of discrete layers of material are deposited onto a surface of a substrate in some alternating or otherwise interleaved pattern as a filter stack, wherein the optical index between individual layers in the filter stack changes abruptly, rather than continuously or gradually. In conventional thin film designs, two discrete layers are alternated, formed with thicknesses very near the quarter-wavelength thickness of some fundamental wavelength. In embodiments of the present invention, the same basic pattern can be used, as well as the addition of a third or other additional materials in the thin film stack, as needed to fine-tune filter response.

A wide variety of materials may be used to form the plurality of discrete material layers in the filter stack. Among such materials, non-limiting mention is made of metals, metallic and non-metallic oxides, transparent polymeric materials, and so-called "soft" coatings, such as sodium aluminum fluoride ($Na_3AlF_6$) and zinc sulfide (ZnS). Further non-limiting mention is made of metallic oxides chosen from silicon dioxide ($SiO_2$), tantalum pentoxide ($Ta_2O_5$), niobium pentoxide ($Nb_2O_5$), hafnium dioxide ($HfO_2$), titanium dioxide ($TiO_2$), and aluminum pentoxide ($Al_2O_5$).

In some embodiments, the plurality of interleaved material layers may include at least two distinct materials. As a non-limiting example, the filters according to the present disclosure may include a plurality of distinct alternating $Nb_2O_5$ and $SiO_2$ layers which have indices of refraction of 2.3 and 1.5, respectively. Alternatively, the filters in accordance with the present disclosure may use an interleaved pattern with at least three distinct materials, such as distinct $Nb_2O_5$, $SiO_2$, and $Ta_2O_5$ layers, each layer having a characteristic index of refraction. Of course, more than three materials and other combinations of materials may also be used within the interleaved layer pattern.

Generally, the filters in accordance with the present disclosure can be manufactured using deposition methods and techniques that are known in the art. For example, these filters may be made with a computer controlled ion beam sputtering system, such as is described in commonly assigned U.S. Pat. No. 7,068,430, entitled "Method of making highly discriminating optical edge filters and resulting products" to Clarke, et al. which is incorporated herein by reference. In general, such a system is capable of depositing a plurality of discrete alternating material layers, wherein the thickness of each layer may be precisely controlled.

Filter designs that specify the layer arrangement in accordance with the present disclosure may be produced by known thin-film filter design techniques. For example, these filter designs may be produced by optimizing the filter spectra and structure of an initial design, such as a traditional multicavity Fabry Perot narrow bandpass interference filter, against a target spectrum using known optical optimization routines. Non-limiting examples of such optimization routines include the variable-metric or simplex methods implemented in standard commercial thin-film design software packages, such as TFCalc by Software Spectra, Inc. of Portland, Oreg., and The Essential Macleod by Thin Film Center, Inc., of Tucson, Ariz. A detailed description of filter design techniques that can be used to produce filter designs according to the present disclosure may be found in U.S. Pat. No. 7,068,430, as noted previously.

In the context of the present disclosure, the term "wavelength band" has its conventional meaning as understood by those skilled in the optical arts. A wavelength band is a continuous range of wavelengths of the electromagnetic spectrum and may consist of one or more wavelengths.

Figure 3:
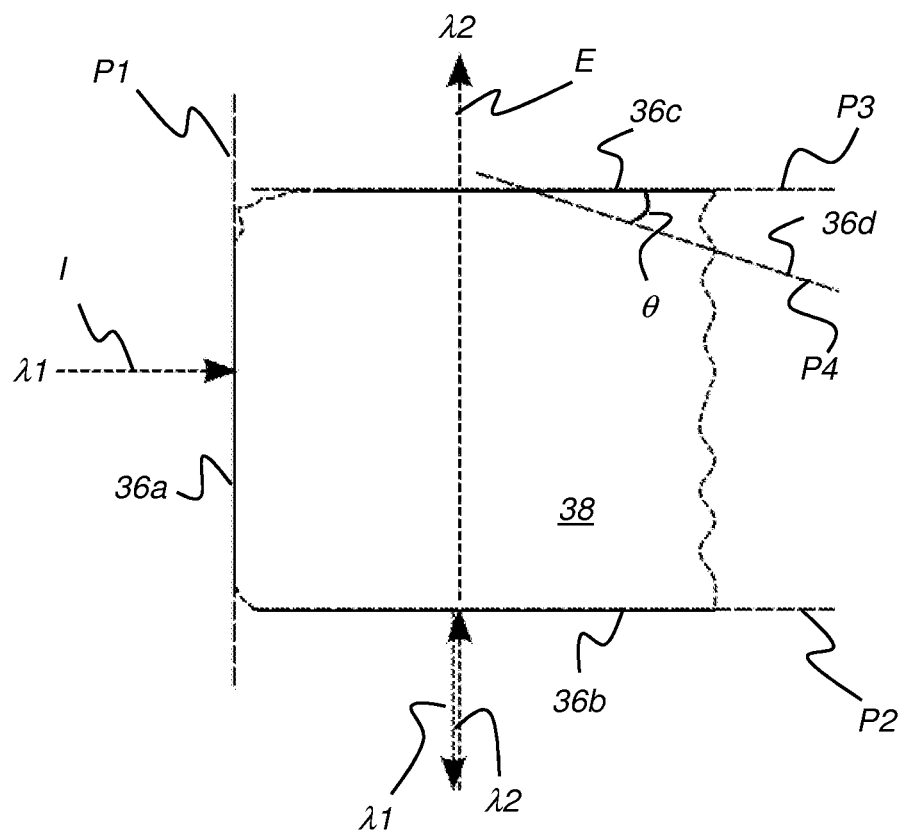
FIG. 3 is a schematic diagram that shows input and output faces of a dichroic beamsplitter prism that applies for various embodiments of the present invention.

The block diagram of FIG. 3 defines various relationships of external and internal surfaces and light paths that are used in common for dichroic beamsplitter prisms according to embodiments of the present invention. A composite glass block beamsplitter 38, formed from two or more prism elements, as described subsequently, has a flat, externally facing surface 36a that lies in a first plane P1. Surface 36a is perpendicular to externally facing surfaces 36b and 36c, which are parallel to each other and that lie in planes P2 and P3, respectively. Surface 36a may or may not have a line of intersection with surfaces 36b or 36c that are orthogonal to surface 36a, depending on the composite beamsplitter cube configuration. There is a fourth surface 36d that is internal to composite beamsplitter 38 and that has a dichroic coating. Internal surface 36d lies within a plane P4 that intersects at least one of planes P1, P2, and P3 at an angle θ that is less than about 25 degrees. In the particular example shown in the schematic of FIG. 3, angle θ is at the intersection of plane P4 with plane P3; angle θ is alternately at the intersection of plane P4 with P1 or P4 with P2 in alternate embodiments of the present invention. This intersection with plane P4 is along the edge of one of the external surfaces 36a, 36b, or 36c in the embodiments shown herein; however, the line of intersection of plane P4 with any of planes P1, P2, or P3 can lie outside the composite prism assembly or within the assembly in other embodiments.

Still referring to FIG. 3, excitation light of one wavelength band denoted by λ1 is incident along an illumination path I at or near normal incidence on surface 36a. Internal to composite beamsplitter 38, the light at λ1 at least reflects off of an embedded multilayer thin-film dichroic coating on surface 36d at an angle of incidence that is substantially less than 45°, and that is generally less than about 25° and preferably less than or equal to about 22.5°. This reflected light then exits composite beamsplitter 38 through surface 36b at or near normal incidence and along an emission path E, so that it is directed toward a sample that is to be excited (downward in the representation shown in FIG. 3). The light emitted from the sample and directed back along path E is at a different wavelength band denoted by λ2. The λ2 light returns along the same optical path E in an equal and opposite direction to that traveled by the light at λ1. The λ2 light enters the composite beamsplitter through surface 36b at or near normal incidence. Internal to glass block composite beamsplitter 38, the light at λ2 at least transmits through the dichroic coating at an angle of incidence that is substantially less than 45°, generally less than about 25°, and preferably less than or equal to about 22.5°. This light then exits the composite beamsplitter 38 through surface 36c at or near normal incidence, along an extension of the same optical path E through which it entered the composite beamsplitter. Emission path E thus extends through the dichroic beamsplitter coating that is within composite beamsplitter 38 and has light traveling in opposite directions.

When glass block composite beamsplitter 38 of FIG. 3 is used in the place of beamsplitter 22 in the microscopy application of FIG. 1, for example, light for excitation from light source 12, after reflection, is sent to the sample in one direction along path E; light emitted from the sample travels the same path E, but in the opposite direction, and continues through composite beamsplitter 38 without deviation. As shown in FIG. 1, filters 20 and 32 are typically also provided when composite beamsplitter 38 is used.

Those skilled in the optical design arts can readily recognize that light can travel in two directions along an optical path. Thus, for example, the roles or directions of λ1 light and λ2 light can be reversed from that shown in FIG. 3, with λ1 light incident on surface 36c and exiting surface 36b and λ2 light incident on surface 36b and exiting surface 36a. In addition, the type of filter that is used for internal surface 36d can be changed from a short wavelength pass (SWP) filter to a long wavelength pass (LWP) filter, as needed for proper light redirection according to its wavelength. It should also be noted that wavelength λ1 could be shorter or longer than wavelength λ2.

In detailed description or figures of subsequent embodiments, external planes P1, P2, and P3 may not be explicitly described or shown as they are in FIG. 3. However, it should be noted that the described embodiments that are given subsequently follow the planar arrangement of surfaces described with reference to FIG. 3 for external planes P1, P2, and P3 and for internal plane P4 that is at an angle of within about 25 degrees relative to at least one of the external planes.

Figure 4A:
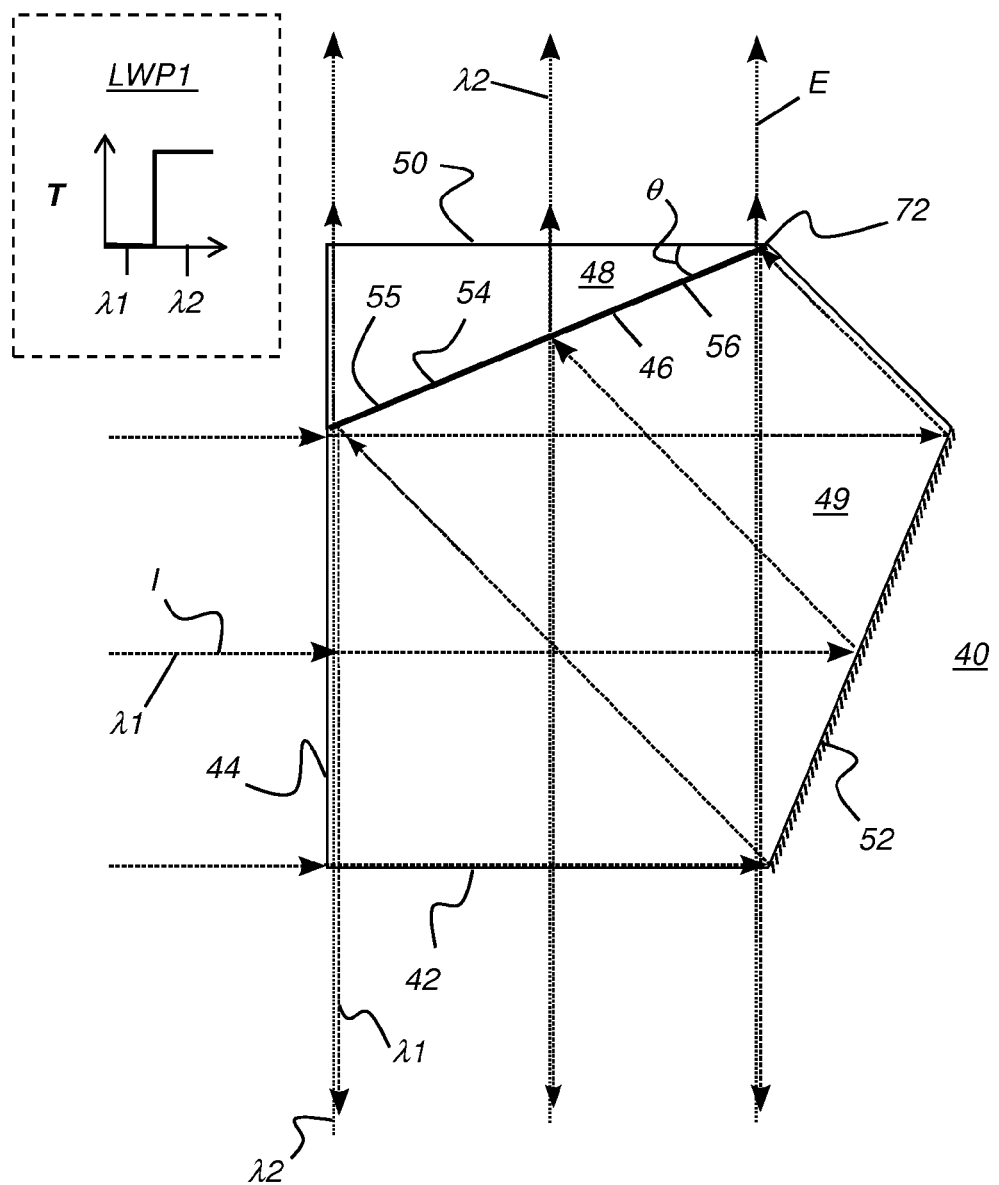
FIG. 4A is a schematic block diagram showing a penta prism beamsplitter for use as a dichroic beamsplitter prism according to an embodiment of the present invention.
Figure 4B:
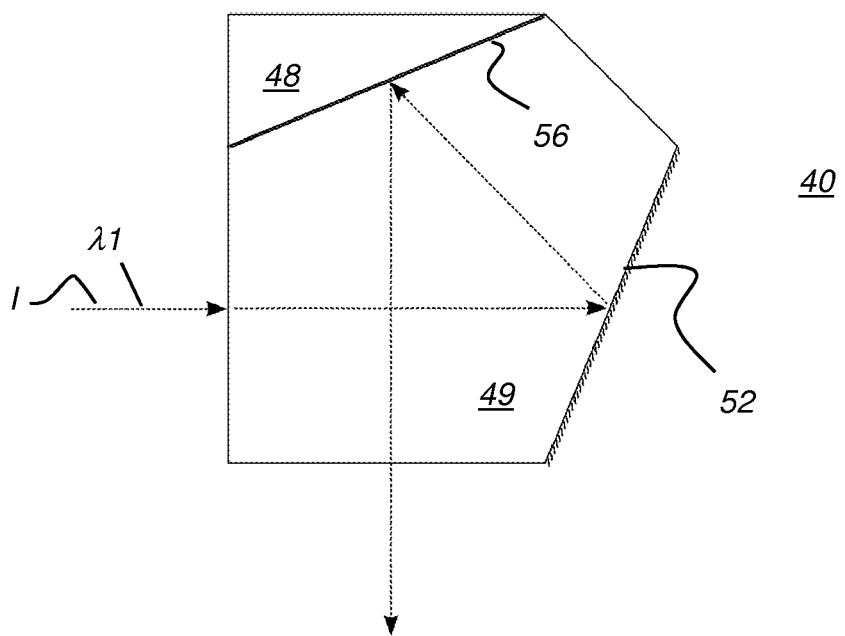
FIG. 4B is a schematic block diagram that shows the path of light of a first wavelength $\lambda 1$ for the penta prism beamsplitter of FIG. 4A.
Figure 4C:
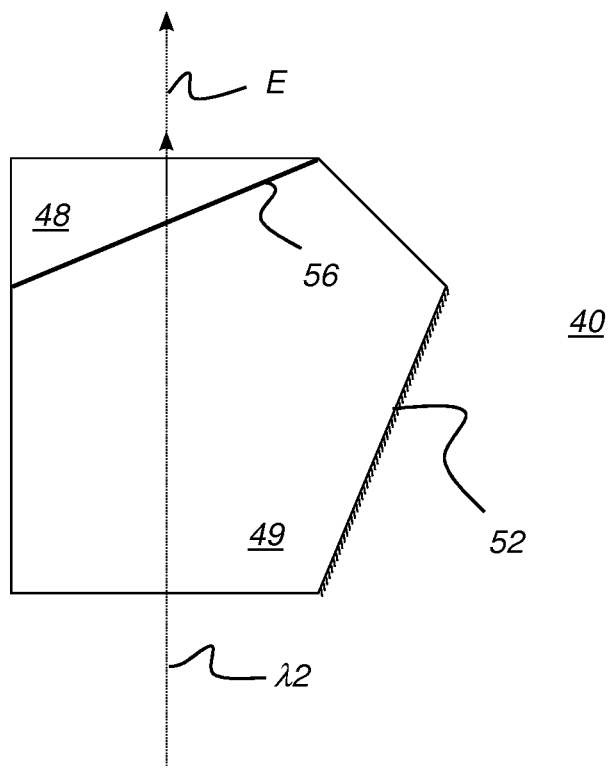
FIG. 4C is a schematic block diagram that shows the path of light of a second wavelength $\lambda 2$ for the penta prism beamsplitter of FIG. 4A.

The schematic view of FIG. 4A shows a composite penta prism beamsplitter 40 according to an embodiment of the present invention, showing the combined paths for both wavelength λ1 and λ2 light. For clarity of description, FIG. 4B shows the general path followed by light of wavelength λ1, isolated from the light of wavelength λ2. FIG. 4C shows only the wavelength λ2 path, with no reflection on surfaces within beamsplitter 40. Beamsplitter 40 is a composite prism formed from two prism elements: a 22.5° wedge prism element 48 and a penta prism element 49. A surface 42 is one of the two perpendicular legs of the penta prism 49, corresponding to plane P2 in FIG. 3; a surface 44 is the other perpendicular leg that accepts incident light along illumination path I in the embodiment of the present invention that is shown in FIG. 4A. Surface 44 corresponds to plane P1 in FIG. 3. A dichroic coating 56 is formed along an interface 55 that lies where a surface 46 of prism element 48 faces a surface 54 of the penta prism element 49. Along the interface 55, wedge prism element 48, along surface 54, is in optical contact with penta prism element 49 along surface 46. A surface 50 is the surface of the wedge prism element 48 that is normal to optical path E and is parallel to surface 42 of the penta prism; surface 50 corresponds to plane P3 of FIG. 3. Angle θ, along an edge 72 between surface 50 and surface 54 that is in optical contact with surface 46 of the penta prism element 49, is at about 22.5 degrees. Coating 56 corresponds to plane P4 of FIG. 3. A surface 52 opposite to surface 46 has a highly reflective coating, such as a thin-film coating that is highly reflective at wavelength λ1. This coating could be a metallic coating, a multilayer thin-film dielectric coating, or a hybrid of both types. In FIG. 4A, this coating is denoted by hatching.

FIG. 4A shows a filter characteristic curve LWP1 for dichroic coating 56 in this embodiment, wherein wavelength λ2 is longer than λ1. As curve LWP1 shows, wherein T indicates relative transmission, dichroic coating 56 is a long-wave-pass (LWP) edge filter coating. The angle of incidence on coating 56 for both the excitation (λ1) and the emission (λ2) light is nominally about 22.5°. At interface 55, coating 56 can be formed on either surface 54 of component prism element 48 or on surface 46 of penta prism element 49.

As can be readily appreciated from the schematic views of FIGS. 4A through 4C, beamsplitter 40 is designed to more effectively isolate the λ1 light from the λ2 light than is done with conventional cube beamsplitters. The λ1 light is incident on dichroic coating 56 at small angles, so that coating 56 can be more efficient as an LWP filter than with conventional cube beamsplitters.

Figure 5A:
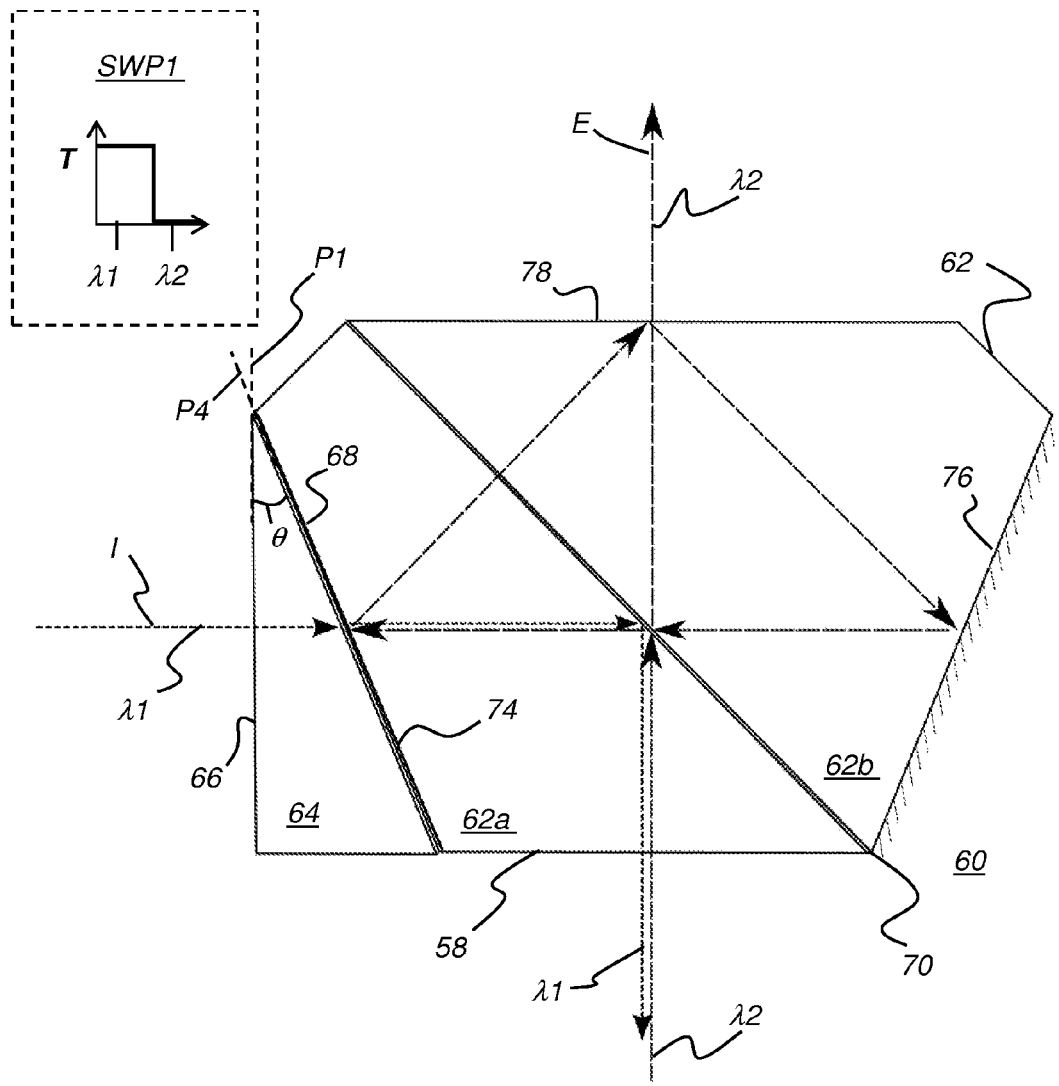
FIG. 5A is a schematic block diagram showing a modified Pechan prism for use as a dichroic beamsplitter prism according to an embodiment of the present invention.
Figure 5B:
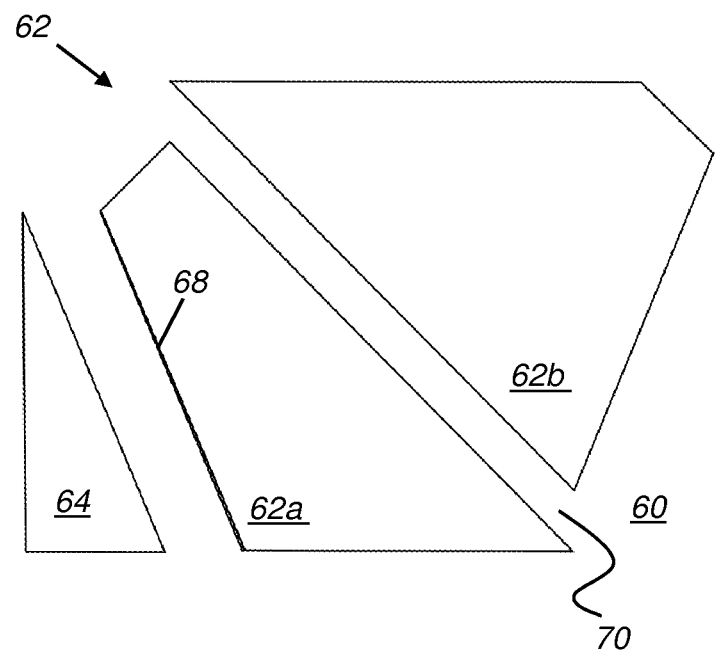
FIG. 5B is an exploded view that shows component prisms that are combined to form the modified Pechan prism of FIG. 5A.

The schematic diagram of FIG. 5A shows an alternate embodiment of a beamsplitter 60 that employs a Pechan prism 62 with a contacted 22.5° wedge prism element 64. As shown more clearly in the exploded view of FIG. 5B, the beamsplitter 60 arrangement makes use of three component prisms. Pechan prism 62 is itself a composite prism formed using two component prisms 62a and 62b having an air gap 70, or gap filled with some other type of material, between them. Prism 62b has a reflective surface 76. Wedge prism element 64 is in optical contact with prism 62a against a surface 74.

Figure 5C:
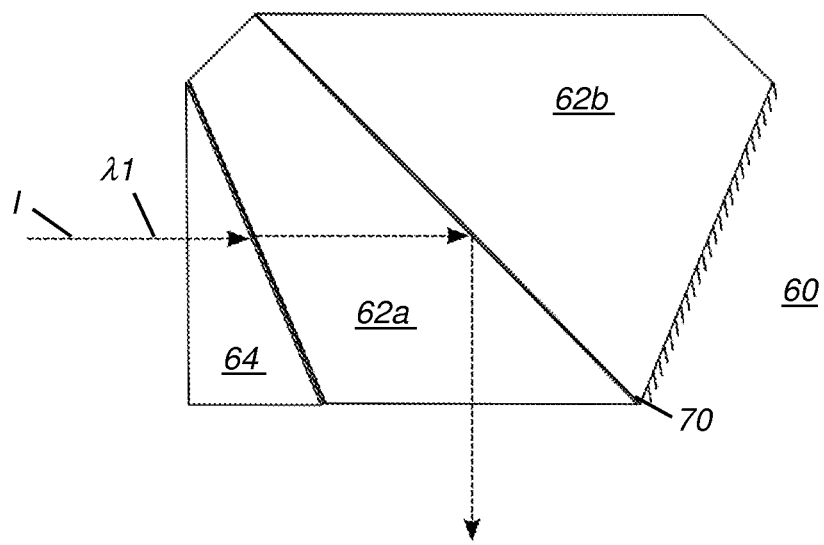
FIG. 5C is a schematic block diagram that shows the path of light of a first wavelength $\lambda 1$ for the modified Pechan prism of FIG. 5A.
Figure 5D:
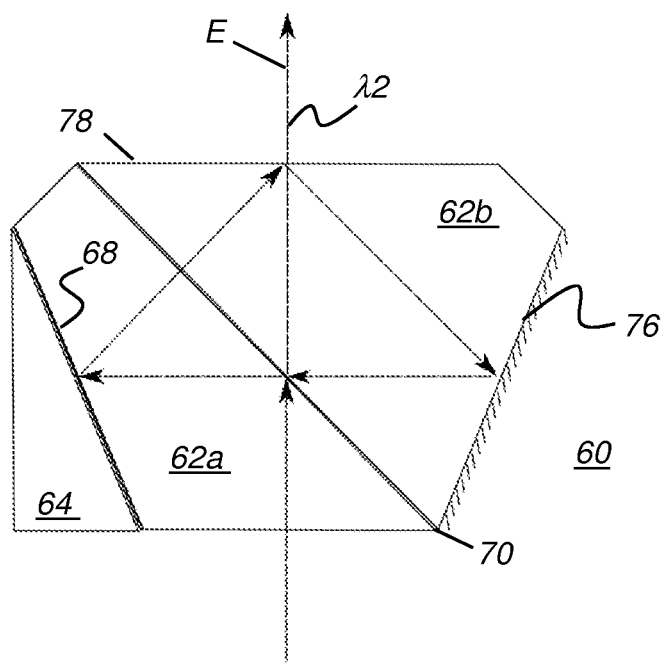
FIG. 5D is a schematic block diagram that shows the path of light of a longer second wavelength $\lambda 2$ for the modified Pechan prism of FIG. 5A.

FIGS. 5C and 5D show the wavelength λ1 and λ2 light paths with the FIG. 5A arrangement. The emission light at λ2 is transmitted through the beamsplitter 60 assembly along optical path E in the same fashion that light is normally transmitted through a Pechan prism. Unlike other Pechan prism embodiments, wedge prism 64 presents an input surface 66 that is normal to light along illumination path I. The light at λ1 is transmitted through a 22.5° dichroic coating 68, and then is turned 90° by reflection at the air gap 70 interface within the Pechan prism via total internal reflection (TIR). Therefore, for this configuration, with wavelength λ2 longer than λ1, dichroic coating 68 is a short-wave-pass (SWP) edge filter coating, as shown at a filter characteristic curve SWP1. The light at wavelength λ2 is incident on a surface 58 and is reflected at air gap 70 by TIR. This reflected light is then reflected from coating 68 and is directed toward a surface 78. Following TIR at surface 78, the light is reflected from surface 76 and directed back toward air gap 70. TIR at gap 70 then redirects the light through surface 78 along path E.

With respect to the basic schematic of FIG. 3, surface 66 of beamsplitter 60 in FIG. 5A corresponds to plane P1; surface 58 corresponds to plane P2; surface 78 corresponds to plane P3. Coating 68 corresponds to plane P4 and may be applied to the facing surface of either prism element 62a or prism element 64 or with portions applied to both facing prism element surfaces.

Figure 6:
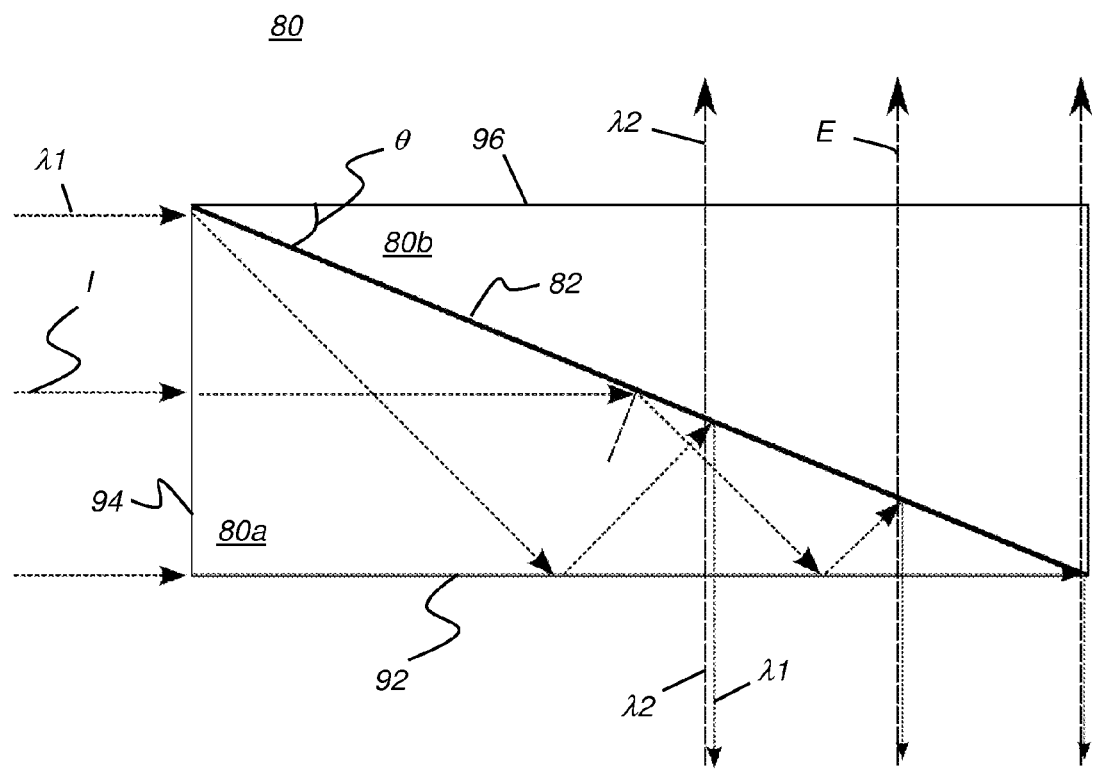
FIG. 6 is a schematic block diagram showing a composite wedge prism for use as a dichroic beamsplitter prism according to an embodiment of the present invention.

The schematic diagram of FIG. 6 shows an alternate embodiment of the present invention, a composite beamsplitter prism 80 formed as a rectangular glass block comprising a pair of wedge prism elements 80a and 80b having facing surfaces, so that each component prism element is in optical contact with the other along its hypotenuse. A dichroic coating 82 runs along the hypotenuse. The example of FIG. 6 shows such a device based on 22.5° wedge prisms 80a and 80b. Angle θ is 22.5 degrees; paired prism elements with angles less than 25 degrees can be used. In this case at least some of the excitation light along illumination path I at wavelength λ1 undergoes multiple reflections from dichroic coating 82. The excitation light at wavelength λ1 then exits the composite prism assembly at or near normal incidence to the assembly surface 92, in a direction 90° relative to the incidence direction. This light redirection can be provided by configuring coating 82 between component prisms 80a and 80b to reflect excitation light at λ1 at a very high angle of incidence (>>45°), and reflect light at λ1 at an angle of incidence substantially smaller than 45° (e.g., 22.5°), but transmit light at λ2 at an angle of incidence of 22.5°. Coating 82 is thus no longer a simple long-wave-pass or short-wave-pass edge filter coating, but rather a coating with a more complex filter characteristic. According to an embodiment of the present invention, the thin-film filter coating is a multi-wavelength filter or filter that transmits multiple wavelength bands and reflects light of wavelengths lying between these wavelength bands. A surface 94 corresponds to plane P1 in FIG. 3; surface 92 corresponds to plane P2; a surface 96 corresponds to plane P3.

Figure 7A:
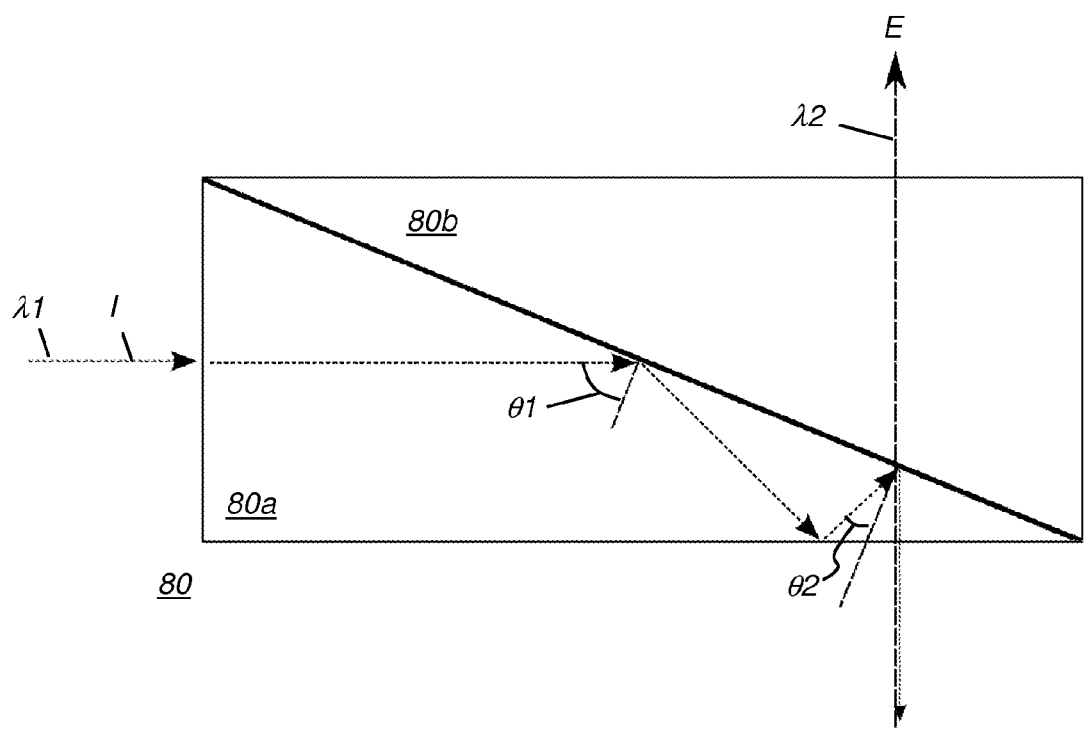
FIG. 7A is a schematic block diagram of a beamsplitter with a more complex dichroic coating for the embodiment of FIG. 6.
Figure 7B:
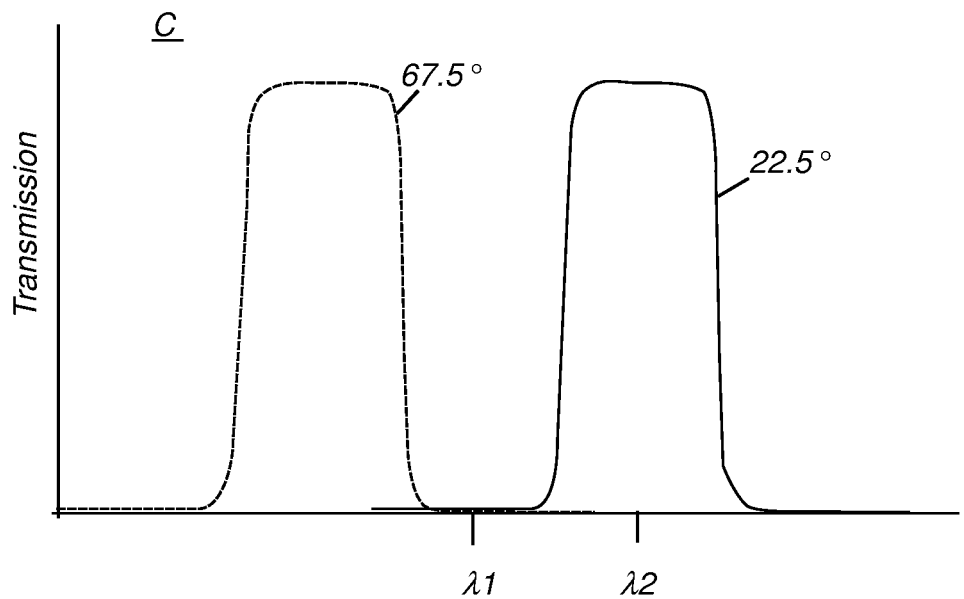
FIG. 7B is a graph showing the filter characteristic for the dichroic coating used in the beamsplitter of FIG. 7A.

One way to provide this more complex coating is described in FIGS. 7A and 7B, which shows a coating at the hypotenuse of each component prism that reflects light at $\lambda_1$ at a very high angle of incidence θ1 (>>45°, such as 67.5° as shown), and also reflects light at $\lambda_1$ at an angle of incidence θ2 that is substantially smaller than 45° (such as at 22.5°). The same coating transmits light at $\lambda_2$ at an angle of incidence of 22.5°. The bandpass filter having a characteristic curve C shown in FIG. 7B provides the more complex behavior that is needed, with the appropriate rate of change of wavelength with angle of incidence to satisfy the given requirements. Methods for design of a filter having this type of characteristic are known to those skilled in the thin film design arts.

Thus, it can be seen that the basic model described with reference to FIG. 3 can be embodied in a number of ways, such as those given in the examples of FIGS. 4A-7A. Other embodiments are possible within the scope of the present invention. Advantageously, light incidence on dichroic coated surfaces within the prism can be much less than 45 degrees, which helps to relax requirements for coating design and helps to improve dichroic performance over conventional cube beamsplitter designs that use 45 degree incidence. Total Internal Reflection (TIR) is used at air gaps and along other surface interfaces to provide reflection with essentially no loss of light.

It should be noted that the cross-sectional sizes of the excitation beam and the emitted or emission beam need not be the same. In some applications, such as with laser-excited total-internal-reflection fluorescence (TIRF) imaging, the excitation beam is much smaller than the emission beam and, further, is not necessarily centered on the same axis as the emission beam. For such systems, other embodiments are possible within the scope of the present invention; some simplification is possible when beam width is smaller than that shown in the FIG. 4A-7A embodiments.

Figure 8:
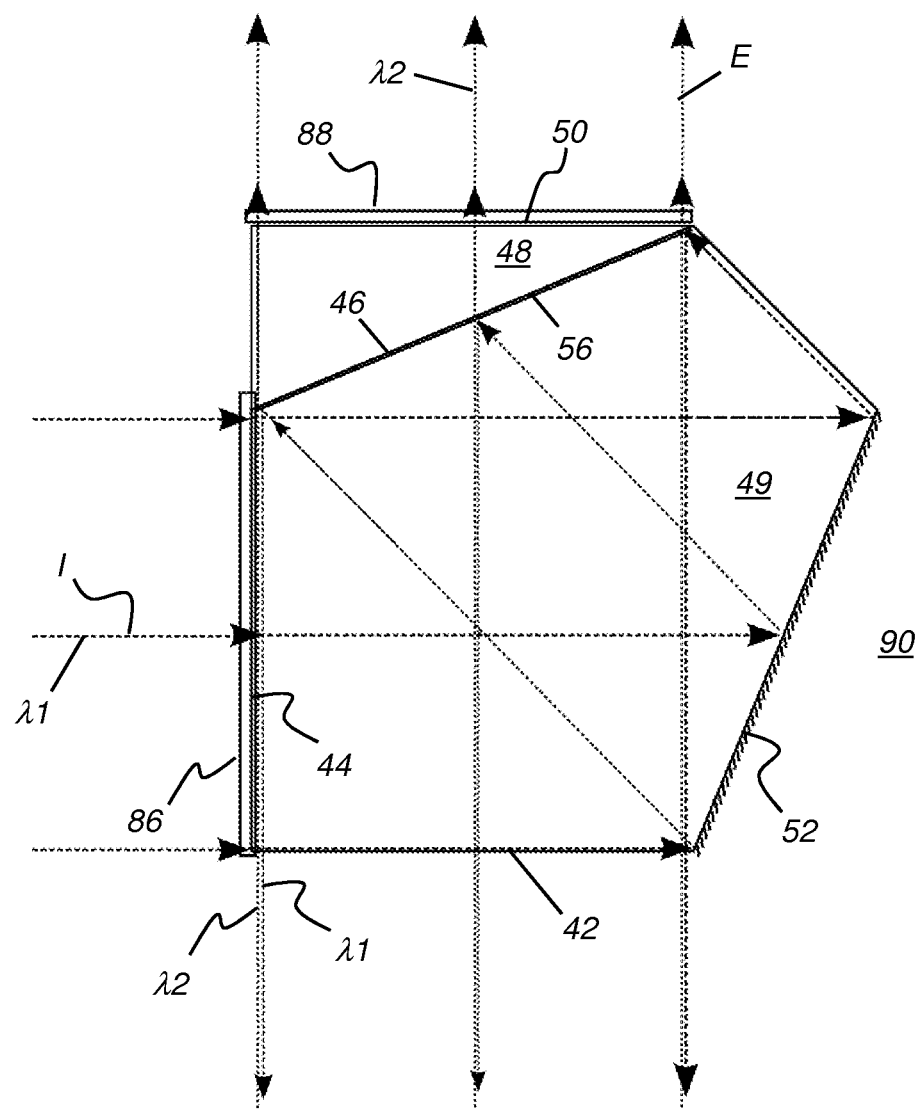
FIG. 8 is a schematic block diagram showing a penta prism beamsplitter for use as a dichroic beamsplitter prism according to an alternate embodiment of the present invention.

In alternate embodiments, external coatings of various types can also be used. FIG. 8 shows a similar embodiment to that shown in FIG. 4A. A prism 90 has additional multilayer thin-film coatings 86 and 88 applied to surfaces 44 and 50 through which light at wavelength λ1 enters and at which light at wavelength λ2 exits, respectively. These coatings might be fluorescence bandpass or edge filters, in analogy to those described in commonly assigned U.S. Pat. No. 7,773, 302 entitled "Low Cost Filter for Fluorescence Systems" to Erdogan et al. With respect to FIG. 1, external coatings 86 and 88 such as those shown in FIG. 8 can supplement or substitute for filters 20 and 32. It should be noted that external coatings 86 and 88 shown for beamsplitter 90 in FIG. 8 can be similarly applied to other beamsplitters described herein, such as to input and output surfaces 44 and 50 of beamsplitter 40 in FIG. 4A, input and output surfaces 66 and 78 of beamsplitter 60 in FIG. 5A, and corresponding surfaces 94 and 96 of beamsplitter 80 in FIG. 6, for example.

Where external coatings are applied, as described with reference to FIG. 8, care must be taken to make sure that light that must be blocked by the filter coatings on the flat, externally facing surfaces is completely accounted for. For example, in the particular case of FIG. 8, excitation light at wavelength λ1 that is not completely reflected by the dichroic coating 56 of surface 46 will pass through the 22.5° wedge prism element 48 and then impact the emission filter coating 88 on the external exit surface of this prism. However, this light will be incident at 22.5° on the emission filter coating 88, which means that the light will see an emission filter spectrum shifted to shorter wavelengths. If this occurs, the shifted emission passband could potentially overlap the excitation wavelength, allowing excitation light in the path leading to the detector. One remedy for this problem is to design the emission filter passband to be sufficiently red-shifted from the excitation wavelength (and/or to ensure that an emission filter with a very low wavelength-to-angle sensitivity is used). Another remedy is to design the dichroic coating itself to have such high reflection at the excitation wavelength, or range of wavelengths, that it provides sufficient blocking by itself, without needing the excitation filter.

According to an alternate embodiment of the present invention, the dichroic filter itself acts as the emission filter in the system, whether a long-wave-pass type or a bandpass type. Such high blocking using a dichroic beamsplitter is generally not done, due to cost or difficulty. However, where there is a smaller angle of incidence, the dichroic filter may exhibit sufficient blocking to reduce demands on emission filter performance or may even eliminate the need for the emission filter altogether.

Figure 9A:
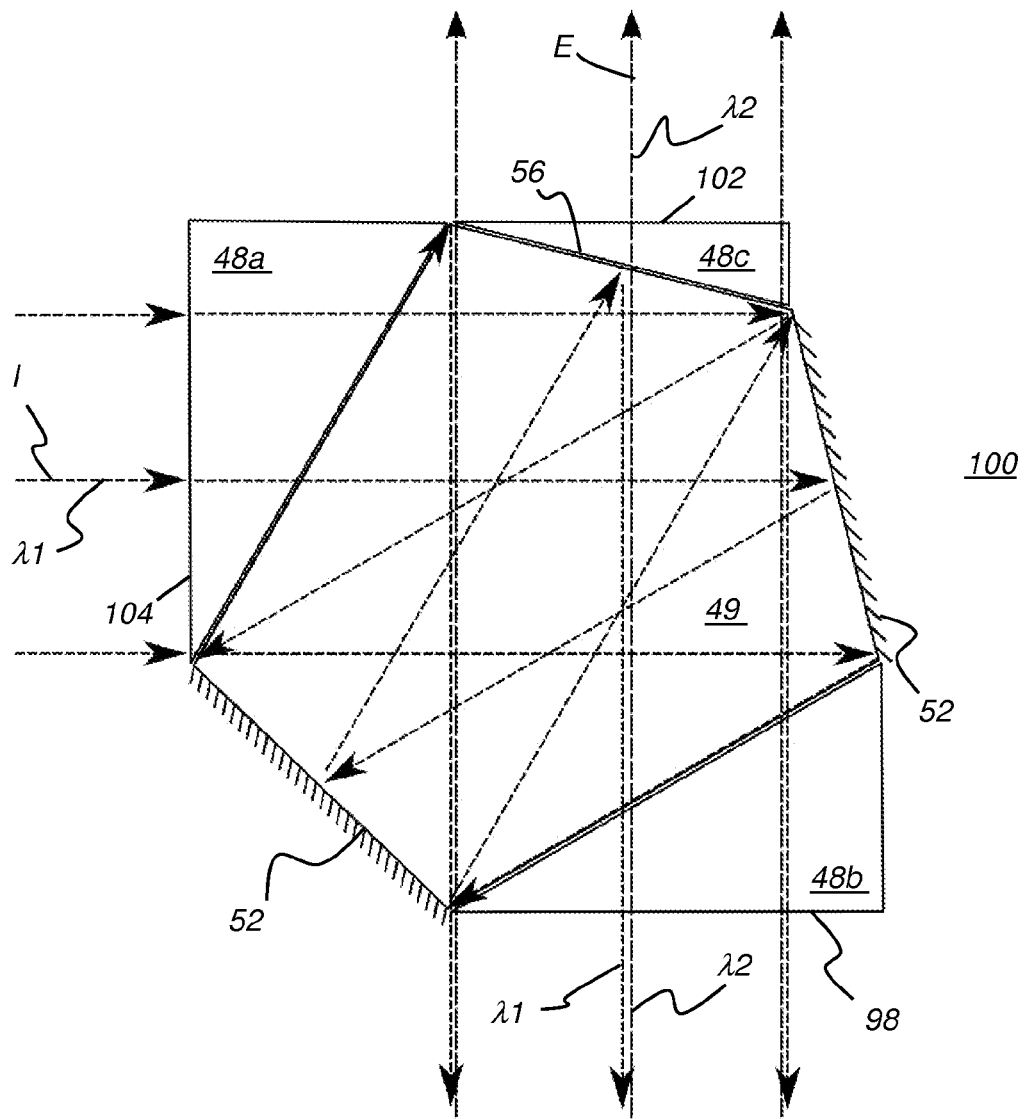
FIG. 9A is a schematic block diagram that shows a composite prism beamsplitter having three internal reflections for incident light of the first wavelength $\lambda 1$.
Figure 9B:
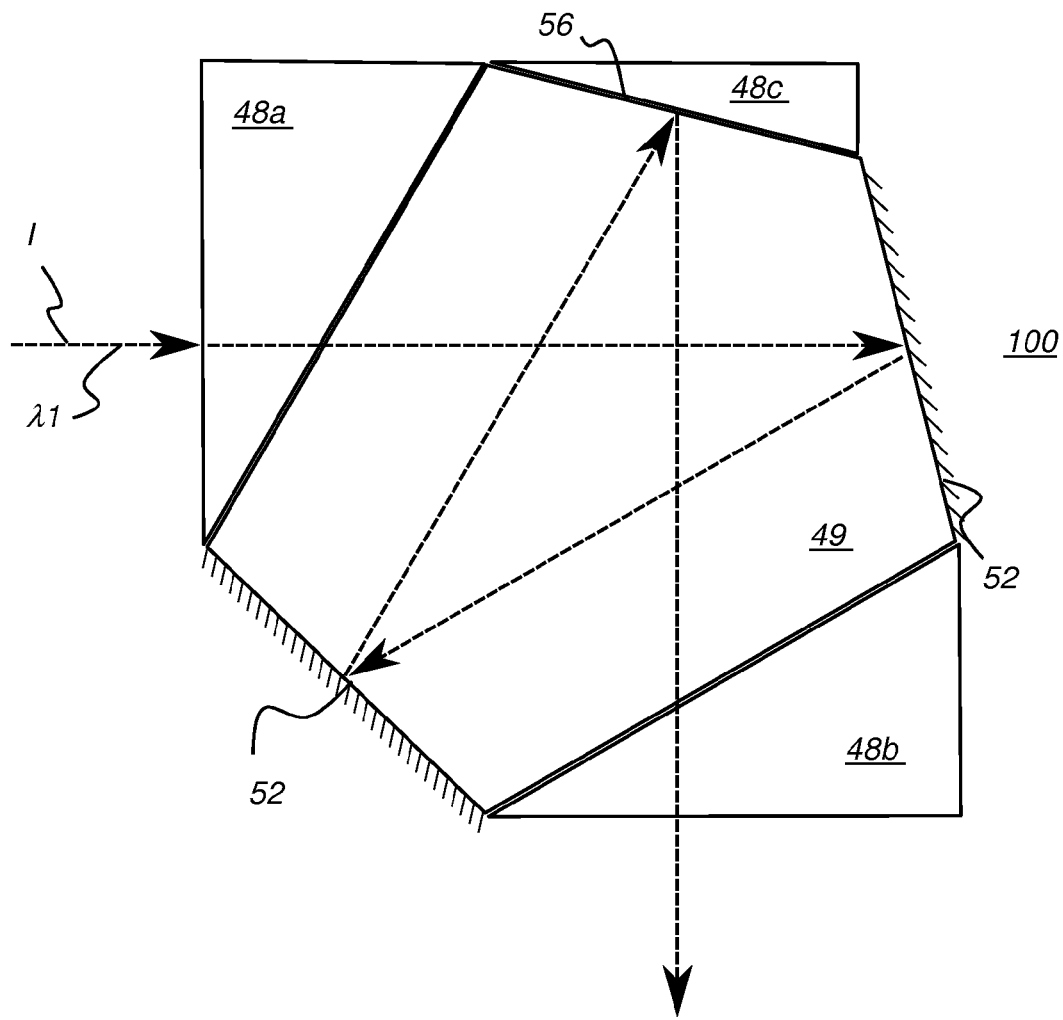
FIG. 9B is a schematic block diagram that shows the path of light of a first wavelength λ1 for the composite beamsplitter of FIG. 9A.

In order to provide orthogonal entry and exit angles, at least an integer number n of reflections must be provided, with n=1, 2, 3, 4, 5, . . . . Depending on the number n that is selected, each reflection internal to the beamsplitter prism is then at 45/n degrees incidence. By way of example, FIG. 9A shows another embodiment of a composite beamsplitter prism 100. FIG. 9B shows only the path of illumination light of wavelength λ1; the path for wavelength λ2 light is straightforward, vertically through prism 100 and exiting a surface 102 in the view of FIG. 9A. The wavelength λ1 light internal to the prism cube is reflected multiple times for orthogonal exit at a surface 98. Composite beamsplitter prism 100 has a penta prism 49 and three wedge prisms 48a, 48b, and 48c, each in optical contact against a corresponding surface of penta prism 49. Alternatively, prisms 48a, 48b, and 49 could comprise a single prism with the same shape as the composite prism shown in FIG. 9A; it can be appreciated that other shape combinations and numbers of prism elements are possible. A coating 56 for reflecting wavelength λ1 and transmitting λ2 is at the interface of wedge prism element 48c and penta prism 49. There are two reflective surfaces 52. With respect to the planes designated in FIG. 3, input surface 104 corresponds to plane P1; surface 98 corresponds to plane P2; output surface 102 corresponds to plane P3.

In the FIGS. 9A and 9B embodiment of the present invention, n=3 reflections are used for wavelength λ1, two from reflective surfaces 52 and one from applied dichroic coating 56. Each reflection is at 15 degrees (45/3=15). In general, as the number of reflections n increases, the size of the prism also increases.

From one aspect, the present invention provides a dichroic beamsplitter comprising a composite prism that has at least first and second prisms that are coupled together along facing surfaces and are either in optical contact with each other along the facing surfaces or spaced apart by a fixed gap such as an air gap. The composite prism has a first flat external surface, a second flat external surface that is perpendicular to the first flat external surface, a third flat external surface that is parallel to the second flat external surface, and a fourth surface internal to the composite prism and having a multilayer thin-film dichroic beamsplitter coating. The plane of the coated fourth surface intersects the plane aligned with at least one of the first, second, and third flat external surfaces at an angle that is within 25 degrees.

From another aspect of the present invention, there is provided a beamsplitter comprising a composite prism that has at least first and second prisms that are coupled together either in optical contact along facing surfaces or spaced apart along the facing surfaces by a fixed air gap. The composite prism has a first planar external surface, a second planar external surface that is perpendicular to the first planar external surface, a third planar external surface that is parallel to the second planar external surface, and a fourth planar surface within the composite prism and having a multilayer thin-film dichroic beamsplitter coating formed thereon, and treated to reflect and transmit light of different wavelengths. The fourth planar surface of the composite prism directs light of a first wavelength that is incident at a normal to the first planar surface to be output at a normal to the second planar surface and directs light of a second wavelength that is incident at a normal on the second planar surface to be output at a normal on the third planar surface. The plane of the coated fourth surface intersects the plane of at least one of the first, second, and third flat external surfaces at an angle that is within 25 degrees.

Figure 10A:
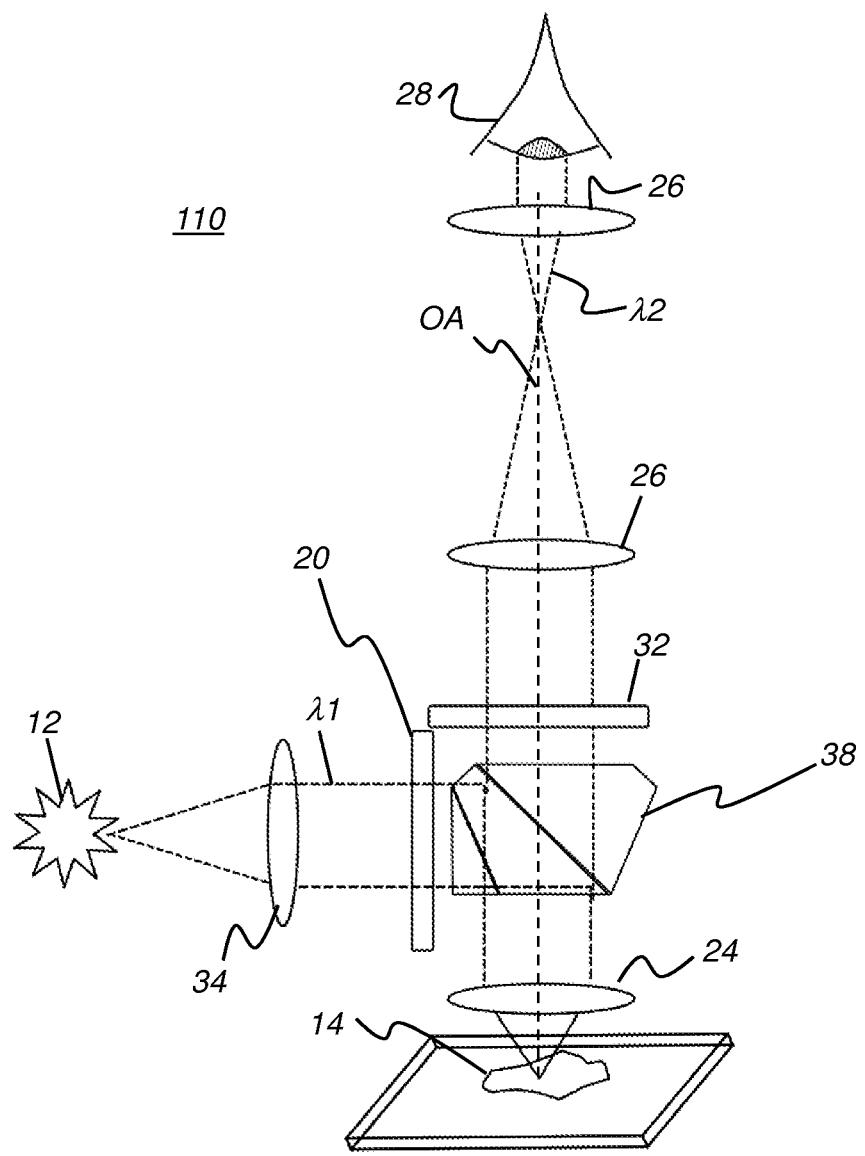
FIG. 10A is a schematic block diagram that shows components of a fluorescence microscope using a composite prism beamsplitter according to an embodiment of the present invention.
Figure 10B:
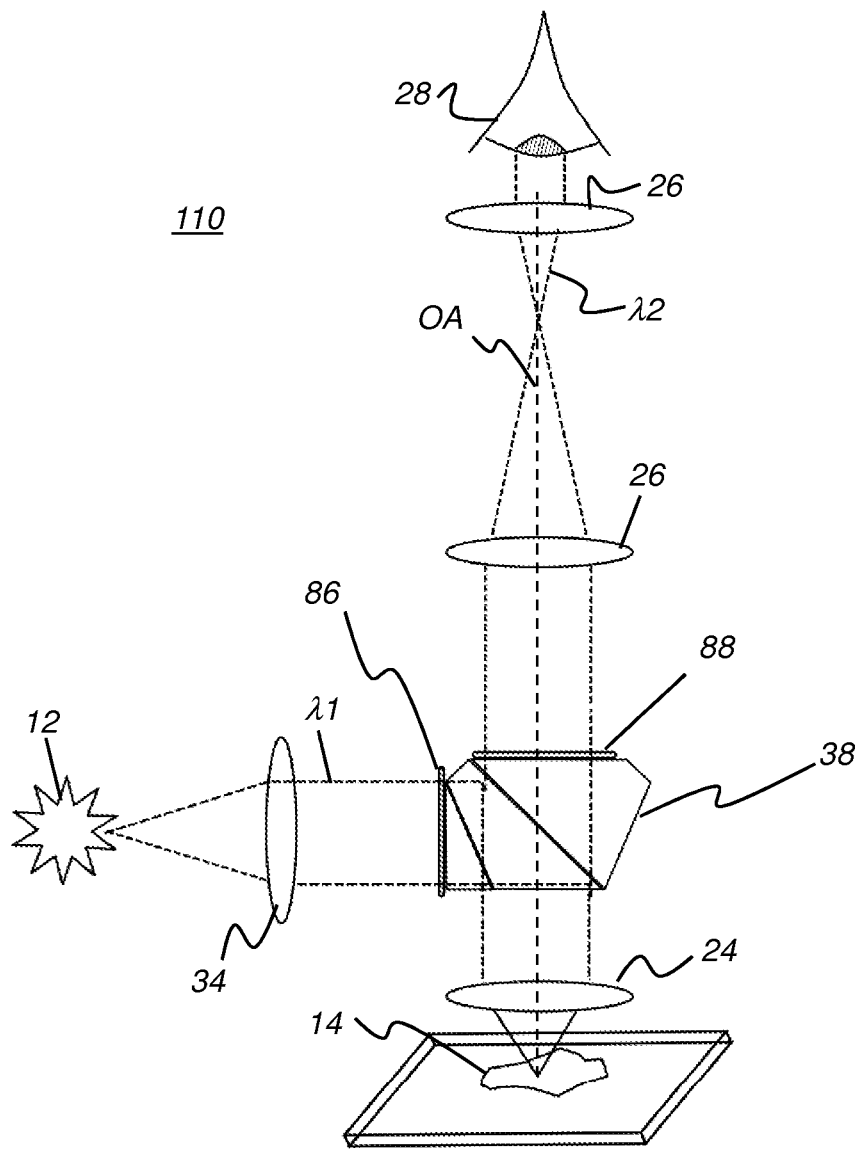
FIG. 10B is a schematic block diagram that shows components of a fluorescence microscope using a composite prism beamsplitter having multilayer filter coatings on its entrance and exit surfaces according to an embodiment of the present invention.

FIG. 10A shows a schematic diagram of a fluorescence microscope 110 using a composite beamsplitter 38 according to an embodiment of the present invention. Composite beamsplitter 38 can be any of the embodiments described herein as beamsplitter 40, 60, 80, or 100, for example. In the FIG. 10A arrangement, external filters 20 and 32 are provided to filter out the wavelength λ1 light. FIG. 10B shows an alternate arrangement, in which any of the composite beamsplitter 38 configurations described herein, such as beamsplitter 40, 60, 80, or 100, can be used with applied coatings 86 and 88 in the place of external filters 20 and 32.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

The invention claimed is:

1. A dichroic beamsplitter comprising:
   a composite prism that has at least first and second prism elements that are coupled together along facing surfaces, wherein the respective facing surfaces of the first and second prism elements are equidistant from each other, wherein the composite prism has:
   (i) a flat external light input surface that lies within a first plane;
   (ii) a flat external light incidence and exit surface that lies within a second plane that is perpendicular to the first plane;
   (iii) a flat external light output surface that lies within a third plane that is parallel to the second plane;
   (iv) a coated surface internal to the composite prism and comprising a multilayer thin-film dichroic beamsplitter coating, wherein the coated surface lies within a fourth plane that intersects at least one of the first, second, and third planes at an angle that is less than about 25 degrees; and
   (v) a flat external reflective surface or a total internal reflection surface,
   wherein the combined surfaces of the composite prism define a first light path that, for received light of a first wavelength that is incident to the light input surface, reflects the first wavelength light from the external reflective or total internal reflection interface surface, directs the first wavelength light to the internal coated surface, and outputs the light of the first wavelength in a first direction along an emission path that exits the light incidence and exit surface, and wherein the combined surfaces of the composite prism further define a second light path that, for received light of a second wavelength longer than the first wavelength and traveling along the emission path in a second direction opposite the first direction, directs the second wavelength light to the coated surface, and to exit, at a normal, through the light output surface.

2. The dichroic beamsplitter of claim 1 wherein the composite prism forms a penta prism.

3. The dichroic beamsplitter of claim 1 wherein the composite prism is formed from three prism elements and includes an air gap between the first and second prism elements.

4. The dichroic beamsplitter of claim 1 wherein the beamsplitter coating on the coated surface provides a short wavelength pass filter.

5. The dichroic beamsplitter of claim 1 wherein the beamsplitter coating on the coated surface provides a long wavelength pass filter.

6. The dichroic beamsplitter of claim 1 wherein the facing surfaces of the first and second prism elements lie in the fourth plane.

7. The dichroic beamsplitter of claim 1 wherein the respective facing surfaces of the first and second prism elements are in optical contact with each other.

8. The dichroic beamsplitter of claim 1 wherein the respective facing surfaces of the first and second prism elements are spaced apart by an air gap.

9. The dichroic beamsplitter of claim 1 wherein the multilayer thin film coating is a first multilayer thin film coating and wherein there is a second multilayer thin film coating on the external light input surface of the composite prism.

10. The dichroic beamsplitter of claim 1 wherein the multilayer thin film coating is a first multilayer thin film coating and wherein there is a second multilayer thin film coating on the external light output surface of the composite prism.

11. The dichroic beamsplitter of claim 1 wherein the at least first and second prisms are substantially identical in shape.

12. The dichroic beamsplitter of claim 1 wherein the multilayer thin film coating transmits multiple wavelength bands and reflects light having wavelengths that lie between the transmitted wavelength bands.

13. A beamsplitter comprising: a composite prism that has at least first and second prism elements that are either in optical contact with each other along the facing surfaces or spaced apart along the facing surfaces by a fixed gap, wherein the composite prism has: (i) a flat external light input surface that lies within a first plane; (ii) a flat external light incidence and exit surface that lies within a second plane that is perpendicular to the first plane; (iii) a flat external light output surface that lies within a third plane that is parallel to the second plane; (iv) a coated surface internal to the composite prism and comprising a multilayer thin-film dichroic beamsplitter coating, wherein the coated surface lies within a fourth plane that intersects at least one of the first, second, and third planes at an angle that is less than about 25 degrees; and (v) a flat external reflective surface or a total internal reflection surface that is oblique with respect to the first, second, and third planes and to the internal coated surface, wherein the combined surfaces of the composite prism define a first light path that, for received light of a first wavelength that is incident to the light input surface, reflects the first wavelength light from the external reflective or total internal reflection surface and outputs the light of the first wavelength in a first direction along an emission path that exits the light incidence and exit surface, and wherein the combined surfaces of the composite prism further define a second light path that, for received light of a second wavelength longer than the first wavelength and traveling along the emission path in a second direction opposite the first direction, directs the second wavelength light to the coated surface, and to exit, at a normal, through the light output surface.

14. The beamsplitter of claim 13 wherein the first prism is a penta prism.

15. The beamsplitter of claim 13 wherein the fixed gap is an air gap.

16. The beamsplitter of claim 13 wherein the composite prism is formed from a Pechan prism and a wedge prism.

17. A glass cube beamsplitter comprising:
a composite prism that has at least first and second prism elements that are coupled together in optical contact along facing surfaces, wherein the composite prism comprises:
(i) a flat external light input surface that lies within a first plane;
(ii) a flat external light incidence and exit surface that lies within a second plane that is perpendicular to the first plane;
(iii) a flat external light output surface that lies within a third plane that is parallel to the second plane;
(iv) a coated surface internal to the composite prism and comprising a multilayer thin-film dichroic beamsplitter coating, wherein the coated surface lies within a fourth plane that intersects at least one of the first, second, and third planes at an angle that is less than about 25 degrees; and
(v) an oblique external or air gap surface that is oblique with respect to the first, second, and third planes and to the internal coated surface,
wherein the disposition of the light input surface, the oblique external or air gap surface, the internal coated surface, and the external light incidence and exit surface of the composite prism define a first light path that, for received light of a first wavelength that is incident to the light input surface, reflects the first wavelength light from the oblique external or air gap surface and outputs the light of the first wavelength in a first direction along an emission path that exits the light incidence and exit surface,
and wherein the disposition of the external light incidence and exit surface, the internal coated surface, and the external light output surface of the composite prism further define a second light path that, for received light of a second wavelength longer than the first wavelength and traveling along the emission path in a second direction opposite the first direction, directs the second wavelength light to the internal coated surface, and to exit through the light output surface.

18. The beamsplitter of claim 17 wherein the coated surface intersects one of the light input, light incidence and exit, or light output surfaces along an edge of the beamsplitter.

19. The beamsplitter of claim 17 wherein the external light input surface has a first multilayer thin-film dichroic coating that transmits the light of the first wavelength and wherein the external light output surface has a second multilayer thin-film dichroic coating that blocks the light of the first wavelength.

20. The beamsplitter of claim 13 further comprising third and fourth prism elements.

\* \* \* \* \*